United States Patent
Yu

(10) Patent No.: US 8,155,143 B2
(45) Date of Patent: Apr. 10, 2012

(54) TRANSMISSION LINE ADAPTER AND SYSTEM

(75) Inventor: Hong Yu, Hollis, NH (US)

(73) Assignee: Aboundi, Inc., Nashua, NH (US)

( * ) Notice: Subject to any disclaimer, the term of this patent is extended or adjusted under 35 U.S.C. 154(b) by 215 days.

(21) Appl. No.: 12/380,656

(22) Filed: Mar. 3, 2009

(65) Prior Publication Data

US 2010/0226380 A1  Sep. 9, 2010

(51) Int. Cl.
*H04L 12/66* (2006.01)
*H04L 12/28* (2006.01)
*H04L 12/56* (2006.01)

(52) U.S. Cl. ........ 370/463; 370/401; 370/402; 375/222; 710/311; 307/98

(58) Field of Classification Search .......... 370/401–402, 370/407, 462–463; 375/222; 710/2, 20, 710/36, 311, 313; 307/98; 340/538.14, 310.15; 379/398, 399.01, 413.02, 413.03
See application file for complete search history.

(56) References Cited

U.S. PATENT DOCUMENTS

| | | | | |
|---|---|---|---|---|
| 5,559,377 A * | | 9/1996 | Abraham | 307/104 |
| 5,577,023 A * | | 11/1996 | Marum et al. | 370/225 |
| 5,625,863 A * | | 4/1997 | Abraham | 725/79 |
| 5,648,984 A * | | 7/1997 | Kroninger et al. | 375/211 |
| 6,396,531 B1 * | | 5/2002 | Gerszberg et al. | 348/14.01 |
| 6,407,987 B1 * | | 6/2002 | Abraham | 370/295 |
| 6,546,016 B1 * | | 4/2003 | Gerszberg et al. | 370/401 |
| 6,724,890 B1 * | | 4/2004 | Bareis | 379/394 |
| 6,844,810 B2 * | | 1/2005 | Cern | 375/258 |
| 6,897,764 B2 * | | 5/2005 | Cern | 375/258 |
| 6,978,474 B1 * | | 12/2005 | Sheppard et al. | 725/83 |
| 7,046,618 B2 * | | 5/2006 | Santhoff et al. | 370/205 |
| 7,245,201 B1 * | | 7/2007 | Kline et al. | 340/12.32 |
| 7,428,238 B2 * | | 9/2008 | El Wardani et al. | 370/401 |
| 7,521,943 B2 * | | 4/2009 | Binder et al. | 324/691 |
| 2003/0099228 A1 * | | 5/2003 | Alcock | 370/353 |
| 2004/0066790 A1 * | | 4/2004 | Valavi et al. | 370/419 |
| 2005/0259668 A1 * | | 11/2005 | Kim | 370/401 |
| 2006/0104291 A1 * | | 5/2006 | Rodriguez et al. | 370/401 |
| 2006/0291575 A1 * | | 12/2006 | Berkman et al. | 375/257 |
| 2007/0036171 A1 * | | 2/2007 | Magin | 370/463 |
| 2007/0076505 A1 * | | 4/2007 | Radtke et al. | 365/222 |
| 2007/0236853 A1 * | | 10/2007 | Crawley | 361/119 |
| 2007/0259644 A1 * | | 11/2007 | Chan et al. | 455/402 |
| 2008/0013637 A1 * | | 1/2008 | Kodama et al. | 375/260 |
| 2008/0159744 A1 * | | 7/2008 | Soto et al. | 398/115 |
| 2008/0317472 A1 * | | 12/2008 | Park et al. | 398/115 |
| 2009/0034595 A1 * | | 2/2009 | Kato et al. | 375/222 |
| 2009/0046742 A1 * | | 2/2009 | Binder | 370/478 |
| 2009/0052144 A1 * | | 2/2009 | Martich | 361/728 |
| 2010/0023994 A1 * | | 1/2010 | Taylor et al. | 725/148 |
| 2010/0080203 A1 * | | 4/2010 | Reynolds et al. | 370/338 |
| 2010/0226380 A1 * | | 9/2010 | Yu | 370/401 |

* cited by examiner

*Primary Examiner* — Aung S Moe
*Assistant Examiner* — Benjamin H Elliott, IV
(74) *Attorney, Agent, or Firm* — Joanne M. Martin

(57) ABSTRACT

A data transmission system forming a network including transmission line sections comprising traditional infrastructure such as AC power line (mains), twisted-pair (e.g. CAT-5) and coaxial cable wiring interconnected with a novel adapter to form a data system also providing data transfer over an extended length and diversity of connected equipment. Further combined with a data bridge connected to conventional format data (e.g. Ethernet) and to the traditional data infrastructure wiring, the novel adapter permits connection to any 2 of twisted pair/multi-pair, coaxial and power mains for data flow therebetween.

13 Claims, 2 Drawing Sheets

TRANSMISSION LINE ADAPTER AND SYSTEM

FIELD OF THE INVENTION

The present invention relates to data system transmission lines and apparatus, in particular to systems and apparatus for extended distance data transmission over conventional transmission lines.

BACKGROUND OF THE INVENTION

Data transmission from point-to-point or via a long network cable often includes known infrastructure wiring, e.g. coaxial cable, twisted-pair or multi-pair (e.g. CAT-5) cable, and building wiring (power mains) as part of the system network. However, existing network standards for data transmission over twisted- or multi-pair (CAT-5) cable prescribes a maximum distance of 650 feet, whereupon a user may wish to have a network or point-to-point connection significantly in excess of that distance. Furthermore, installation guidelines and skills are well known for such traditional wiring, which may already be installed in certain structures.

SUMMARY OF THE INVENTION

According to one embodiment of the present invention, a data transmission system is provided comprising a network including transmission line sections comprising traditional infrastructure wiring interconnected with a novel adapter. Further combined with a data bridge connected to conventional format data and to the traditional data infrastructure wiring, the novel adapter permits connection to any 2 of twisted pair/multi-pair, coaxial and power mains for data flow therebetween.

BRIEF DESCRIPTION OF THE INVENTION

Figure 3:
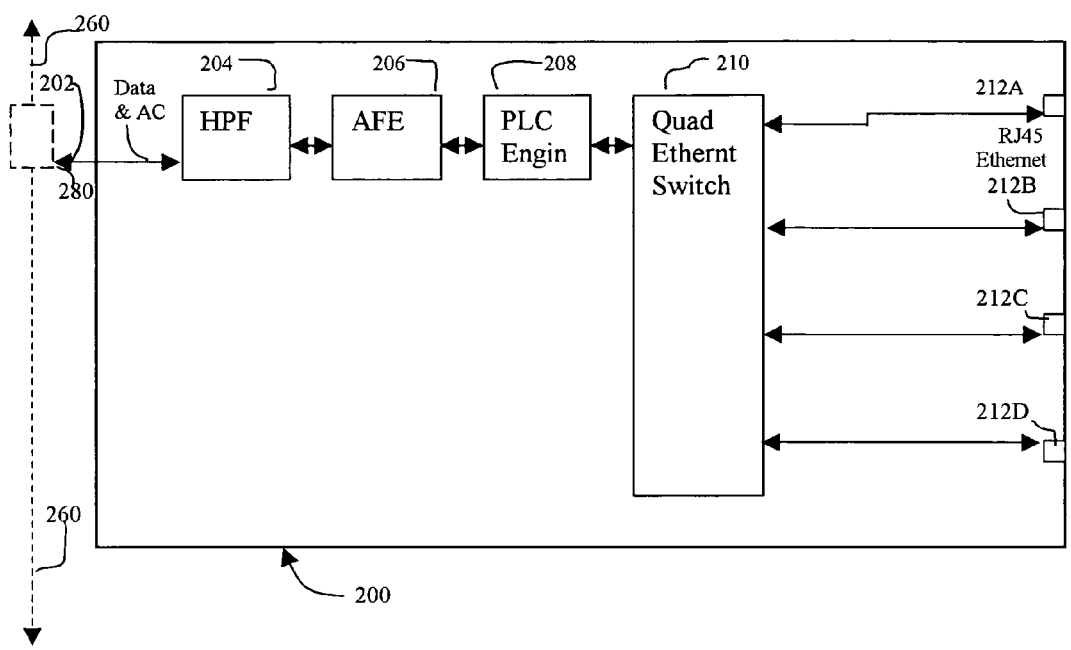
Figure 1:
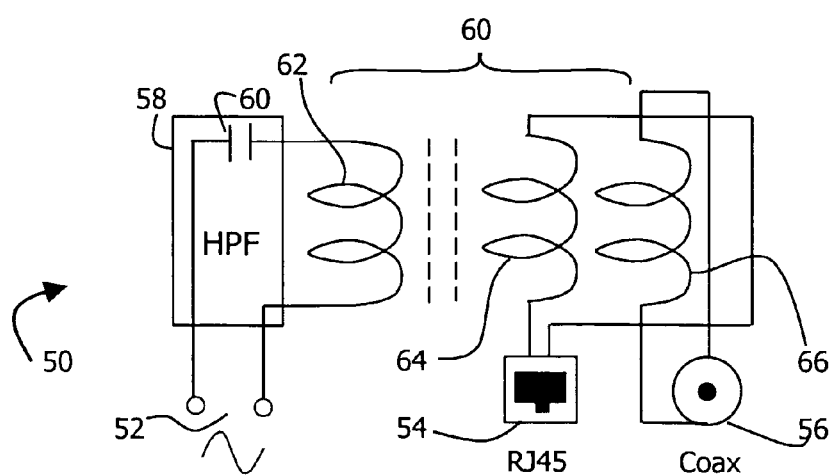
Figure 2:
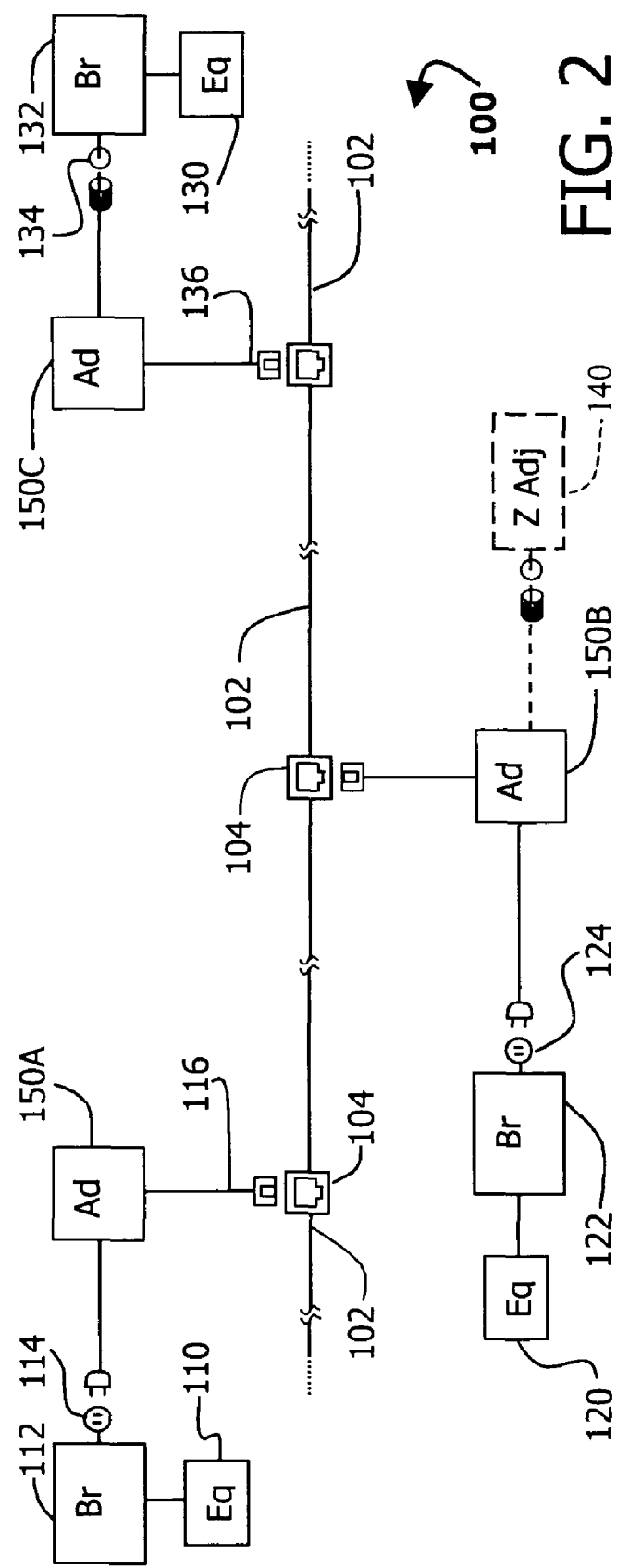

These and further features according to the present invention will be better understood by reading the following Detailed Description, taken together with the Drawing, wherein FIG. 1 is a schematic diagram according to an exemplary embodiment of a 3-port adapter according to the present invention;

FIG. 2 is a block diagram of an exemplary network system provided according to the present invention; and FIG. 3 is a block diagram of an exemplary data bridge according to one embodiment of the present invention.

DETAILED DESCRIPTION

The present invention provides flexible interconnectivity between a diversity of media types. One embodiment 50 as shown in FIG. 1 comprises a multi-port passive media coupler, including a "power line" port 52, a twisted-pair port 54, and a coaxial cable port 56. The ports are mutually coupled with a transformer 60 including a winding 62, 64 and 66 connected to the ports 52, 54 and 56 respectively. The transformer typically comprises a core 68 including a ferrite core and the windings 62, 64 and 66 comprise one turn more or less considering the impedances to be achieved, would together side-by-side ('trifilar') and passing through a window or hole in a core structure which surrounds the windings to enhance the coupling of the data signal. Other transformer structures providing signal coupling with a pass-band corresponding to the data signal transmitted therethrough, e.g. 1-50 MHz in the present exemplary embodiment, may be incorporated.

Further according to the embodiment 50, the transformer coupling the media ports 52, 54 and 56 includes winding and related structure to reflect the impedance of one port to the other. Accordingly, the effective impedance of the "power line", found to be around 50 ohms to which port 52 is connected, can be effectively matched to the impedance of a typical twisted-pair, having an impedance around 600 ohms or less and connected to port 54 or a coaxial cable (e.g. 50, 75, etc. ohm) connected to port 56, vice-versa, or between any two ports. When media having the expected impedance are the appropriate port, the media coupler 50 provides an impedance-matched connection between differing media with the unused port being unterminated (open). However, further embodiments include the addition of a termination circuit 140 (being resistive, reactive or combination) connected to the port not connected to a media and adjusted or selected to provide impedance correction to media connected to the media coupler 50 other than the impedances for which the particular media coupler was provided.

Frequently the connected medium includes signals that are not desired to be transferred to the other medium connected, or potentially harmful to the components (e.g. the transformer 60) of the media coupler 50. Accordingly, a filter may be applied to any and all of the data ports or between the ports and the corresponding winding. An exemplary high pass filter 58 is shown including a capacitor 68 selected to allow the data signals to be efficiently coupled between the port 52 and the corresponding winding 62, while providing a high rejection of the AC power line (mains, e.g. 120 Vac, 60 Hz) signal. The port 56 for coaxial cable is connected to winding 66 and the port 54 for twisted-pair cable is connected to winding 64. However, further embodiments according to the present invention may include a passive or active filter selected to provide specific, high-pass, low-pass, band-pass, band-reject, equalization (delay, phase, frequency, etc.) characteristics. Furthermore, embodiments having ports connected to filters of differing filters selected to provide connection of data at differing frequencies over different ports such that more than 2 ports may be connected to a medium.

An exemplary network (system) 100 as may be provided according to the present invention is shown in FIG. 2, wherein an exemplary twisted-pair medium 102, such as included in a CAT-5 cable connected to a plurality of common RJ45 connectors 104 along its length, which may exceed a length that Ethernet format data may reliably be exchanged to data equipment connected thereto. A first exemplary data equipment 110 is connected to a data bridge 112 transforming to and from a format transferable over a power line via a port 114, which may connected to the power line (not shown) to which the media coupler 150A is connected, or the media coupler may be plugged directly into the data line port 114. In turn, the twisted-pair port 116 of the media coupler 150A is connected to a conveniently located twisted pair connector 102, wherein the remaining port of the media coupler 150A is typically open (unterminated). A second exemplary data equipment 120 is provided in FIG. 2, also having a power line data bridge 122 to which a media coupler 150B is connected via a power line connection 124 (directly or via a power line, not shown). The media coupler 150B is further connected by plugging into a convenient connector 104 along the length of the medium 102, and the unused coaxial port of the media coupler 150B is left open. Alternately, an impedance adjusting network 140 discussed above, may also be connected to the media coupler 150B (or 150A or 150C) port not connected to a medium.

A third exemplary data equipment 132 is connected to the medium 102 via a data bridge 132, providing data communication according to a coaxial medium at a connection 134 and typically band-limited (e.g. to less than 50 MHz in one embodiment) to which a media coupler 150C is connected. The twisted-pair port of the media coupler 150C is connected to the medium 102 via a convenient connector 104 along its length. The power-line port of the media coupler 150C is typically unterminated (open).

The present invention also includes a system having a media coupler according to the present invention connecting the power line port and the coaxial cable port wherein the twisted-pair port is unterminated (open), similar to the embodiment 100 of FIG. 1 but where the medium (102) is different, e.g. comprising a power line or coaxial cable medium. Further systems according to the present invention include point-to-point connection connected at ends of a selected power-line, twisted-pair or coaxial cable medium, or another medium for which an appropriate transformer winding, filter or other media coupler component is selected to provide the desired impedance matching, isolation, filtering, signal loss, etc. characteristic.

An exemplary data bridge 150 according to the present invention is shown in FIG. 3, wherein the power line or mains 260 is shown with outlet 280 disposed therealong, and may include separate branch circuits having a common junction with sufficient data signal coupling to maintain acceptable fidelity of data transmission thereover in the signal range of interest for the protocol or format of the data bridge 200.

A connection is made between a bidirectional high pass filter (HPF) 204 and the mains outlet 280 and/or to the power line port 52 of the data coupler 50 according to the present invention via connector 202 typically a power line (mains) plug which may be connected to power this or other equipment (not shown), wherein the HPF 204 removes much if not all of the AC power (and other low frequency) signals leaving the path intact for signals corresponding to the data signals applied thereover. The other side of the HPF 204 is connected to an analog front end (AFE) 206 which applies the digital signal generated by the transmitter portion of the PLC transceiver 208 to the mains 260 as a suitably conditioned signal, and provides a suitably conditioned (e.g. amplified/attenuated, shaped, etc.) return path from the mains 260 to the receiver portion of the PLC transceiver 208. The PLC transceiver 208 can communicate directly with connected data equipment (not shown) connected to jack 212A or other suitable connector, or may be connected to multiple other data equipment (also not shown) by jacks 212B-212D via a data switch 210 or equivalent.

In the embodiments shown, the data bridge 112 provides data to the power line (mains) port 114 according to the IEEE (Institute of Electrical and Electronics Engineers) Ethernet Over Powerline standards, also described in the HomePlug white paper Doc. HPAVWP-050818, incorporated by reference. However, the system and media coupler according to the present invention accommodates and includes in its scope other common or custom media formats. Further modifications and substitutions made by one of ordinary skill in the art are within the scope of the present invention, which is not to be limited, except by the claims, which follow.

What is claimed is:

1. A data transmission system, comprising:
a first data bridge receiving data from a first data port, further including a first data coupler to provide a first data path to a selected one of an AC mains circuit at a first data port coupler AC mains port, a twisted-pair cable at a first data port coupler twisted-pair port and a coaxial cable at a first data port coupler coaxial cable port;
a second data path having a transmission line characteristic different from said selected one of said AC mains circuit, said twisted-pair cable and said coaxial cable; and
a second data coupler comprising a three-port data coupler including a second data coupler AC mains port, a second data coupler twisted-pair port, and a second data coupler coaxial cable port having a first of said three data ports connected to said selected one of said AC mains circuit said twisted-pair cable and said coaxial cable and a second of said three ports connected to said second data path.

2. The data transmission system of claim 1, wherein said second data coupler is a passive coupler.

3. The data transmission system of claim 1, wherein said second data coupler is adapted to provide impedance matching between said first data path and said second data path wherein a third data port of said second data coupler is unterminated.

4. The data transmission system of claim 1, further including an impedance adjusting network connected to a third data port of said second data coupler.

5. The data transmission system of claim 1, wherein said first data bridge provides data to said AC mains port according to the IEEE Power Over Internet specification.

6. The data transmission system of claim 5, wherein said first data coupler includes an AC mains port further connected to an AC mains circuit.

7. The data transmission system of claim 1, wherein said data bridge includes an input port adapted to receive and transmit Ethernet format standard data.

8. The data transmission system of claim 1, further including a second data bridge connected to said second data path and provide data transfer between said second data path and a data port having a non-second data path transmission characteristic.

9. A data coupler, comprising:
a primary circuit having a high-pass signal characteristic, and including a power mains connection;
a secondary circuit having a coaxial cable connection;
a tertiary circuit having a twisted-pair connection; and
an inductive coupler providing a signal path between at least two of said primary, secondary, and tertiary circuits, wherein
said inductive coupler provides an impedance match, between any two of said primary circuit, said secondary and said tertiary circuit to another of said primary circuit, said secondary circuit and said tertiary circuit with the remaining of said primary circuit, said secondary circuit, and said tertiary circuit remaining unconnected.

10. The data coupler of claim 9, wherein said primary circuit includes a high-pass filter providing said high pass characteristic.

11. The data coupler of claim 10, wherein
said primary circuit is connected to an AC power mains having electrical power thereon at a power mains frequency, and
said high pass filter substantially rejects signals at said AC power mains frequency.

12. The data coupler of claim 9, wherein said signal path comprises a signal path having a bandwidth substantially of 1-50 Mhz.

13. The data coupler of claim 9, comprising a passive data coupler.

* * * * *